United States Patent
Zhang

(10) Patent No.: US 10,425,815 B2
(45) Date of Patent: Sep. 24, 2019

(54) UNLOCKING CONTROL METHOD AND MOBILE TERMINAL

(71) Applicant: Guangdong Oppo Mobile Telecommunications Corp., Ltd., Dongguan, Guangdong (CN)

(72) Inventor: Haiping Zhang, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/962,655

(22) Filed: Apr. 25, 2018

(65) Prior Publication Data

US 2018/0317088 A1 Nov. 1, 2018

(30) Foreign Application Priority Data

Apr. 28, 2017 (CN) .......................... 2017 1 0297222

(51) Int. Cl.

| | |
|---|---|
| H04W 12/06 | (2009.01) |
| G06F 21/32 | (2013.01) |
| G06K 9/00 | (2006.01) |
| H04L 29/06 | (2006.01) |
| G06F 3/0488 | (2013.01) |
| H04M 1/725 | (2006.01) |
| G06F 3/041 | (2006.01) |
| H04W 88/02 | (2009.01) |

(52) U.S. Cl.
CPC ........ *H04W 12/06* (2013.01); *G06F 3/04886* (2013.01); *G06F 21/32* (2013.01); *G06K 9/0002* (2013.01); *G06K 9/00026* (2013.01); *G06K 9/00087* (2013.01); *H04L 63/0861* (2013.01); *H04M 1/72577* (2013.01); *G06F 3/0412* (2013.01); *H04W 88/02* (2013.01)

(58) Field of Classification Search
CPC .... H04W 12/06; H04W 88/02; G06K 9/0002; G06K 9/00087; G06K 9/00026; H04M 1/72577; G06F 3/0412; G06F 3/04886; G06F 21/32; H04L 63/0861
USPC .......................................... 455/411, 410, 418
See application file for complete search history.

(56) References Cited

U.S. PATENT DOCUMENTS

| | | | |
|---|---|---|---|
| 9,432,367 B2 * | 8/2016 | Wei ......................... | G06F 21/32 |
| 2004/0125993 A1 * | 7/2004 | Zhao .................. | G06K 9/00006 |
| | | | 382/124 |

(Continued)

FOREIGN PATENT DOCUMENTS

| | | |
|---|---|---|
| CN | 201628972 U | 11/2010 |
| CN | 106066764 | 11/2016 |

OTHER PUBLICATIONS

Extended European search report issued in corresponding European application No. 18168683.3 dated Sep. 14, 2018.

*Primary Examiner* — Mong-Thuy T Tran
(74) *Attorney, Agent, or Firm* — Young Basile Hanlon & MacFarlane, P.C.

(57) ABSTRACT

An unlocking control method and a mobile terminal are provided. The mobile terminal includes a fingerprint identification device. The fingerprint identification device includes N fingerprint identification units. A fingerprint collecting surface of at least one of N fingerprint identification units is configured to wait for a touch of a user in a process of fingerprint collecting. The fingerprint identification device at least includes two types of fingerprint identification units.

16 Claims, 7 Drawing Sheets

(56) References Cited

U.S. PATENT DOCUMENTS

| | | | |
|---|---|---|---|
| 2016/0070404 A1* | 3/2016 | Kerr | G06F 3/0418 |
| | | | 345/174 |
| 2016/0132712 A1 | 5/2016 | Yang et al. | |
| 2016/0171281 A1* | 6/2016 | Park | G06F 1/1643 |
| | | | 382/124 |
| 2016/0188023 A1* | 6/2016 | Chang | G06K 9/00013 |
| | | | 345/173 |
| 2016/0306491 A1* | 10/2016 | Lee | G06F 3/04883 |
| 2016/0314334 A1 | 10/2016 | He et al. | |
| 2017/0076080 A1* | 3/2017 | Hao | G06F 21/32 |
| 2017/0220838 A1* | 8/2017 | He | G06K 9/0004 |
| 2017/0270342 A1* | 9/2017 | He | G06F 3/0412 |
| 2017/0300736 A1* | 10/2017 | Song | G06K 9/00033 |
| 2018/0039819 A1* | 2/2018 | Jiang | G06K 9/00013 |
| 2018/0101711 A1* | 4/2018 | D'Souza | G06F 21/32 |
| 2018/0225495 A1* | 8/2018 | Jonsson | G06K 9/0002 |
| 2019/0065808 A1* | 2/2019 | Zhang | G06F 3/0412 |

\* cited by examiner

UNLOCKING CONTROL METHOD AND MOBILE TERMINAL

CROSS-REFERENCE TO RELATED APPLICATION(S)

This application claims priority to Chinese Patent Application No. 201710297222.8, filed on Apr. 28, 2017, the content of which is hereby incorporated by reference in its entirety.

TECHNICAL FIELD

This disclosure relates to the technical field of terminal devices, and more particularly to an unlocking control method and a mobile terminal.

BACKGROUND

More and more mobile terminals (for example, mobile phones, tablets, etc.) are equipped with a fingerprint identification function. Fingerprint identification technology can not only be configured for functions such as waking up or unlocking the mobile terminal, but also be configured for mobile payment, account login, and the like. For its convenience and high-security features, the fingerprint identification technology is widely used.

With the evolution of the fingerprint identification technology, the technology is increasingly appreciated by manufacturers of terminal devices. For now, the fingerprint identification device only has one feature. For example, a capacitive fingerprint identification device can only collect fingerprint images through skin contact. Therefore, the feature of the fingerprint identification device is relatively simple. How to enrich the feature of the fingerprint identification device is a problem needs to be solved.

SUMMARY

A mobile terminal including a fingerprint identification device is provided. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units.

An unlocking control method applied to a mobile terminal including an application processor (AP), a touch-control display screen, and a fingerprint identification device is provided. The fingerprint identification device includes N fingerprint identification units and at least includes two types of fingerprint identification units. The method includes: controlling, by the mobile terminal, the touch-control display screen to inform the N fingerprint identification units of the fingerprint identification device corresponding to a target area to collect fingerprints, when a touch operation of a user on the target area is detected; N is a positive integer; controlling, by the mobile terminal through the fingerprint identification device, the N fingerprint identification units to collect the fingerprints to obtain N fingerprint images, and sending the N fingerprint images to the AP; verifying, by the AP under control of the mobile terminal, the N fingerprint images, and performing a fingerprint unlocking operation when a verification of the N fingerprint images is successful.

A non-transitory computer-readable storage medium is provided. The non-transitory computer-readable storage medium is configured to store computer programs for electronic data interchange, and the computer programs are operable with a computer to perform the following operations: controlling, by a mobile terminal, a touch-control display screen to inform N fingerprint identification units of a fingerprint identification device corresponding to a target area to collect fingerprints, when a touch operation of a user on the target area is detected; N is a positive integer; controlling, by the mobile terminal through the fingerprint identification device, the N fingerprint identification units to collect the fingerprints to obtain N fingerprint images, and sending the N fingerprint images to the AP; verifying, by the AP under control of the mobile terminal, the N fingerprint images, and performing a fingerprint unlocking operation when a verification of the N fingerprint images is successful.

BRIEF DESCRIPTION OF THE DRAWINGS

To describe the technical solutions in the implementations of the present disclosure more clearly, the following briefly introduces the accompanying drawings required for describing the implementations. It will be apparent that, the following described drawings are merely illustrative of the present disclosure. It will be apparent to those skilled in the art that other drawings can be obtained from the drawings without creative work.

DETAILED DESCRIPTION

Figure 1:
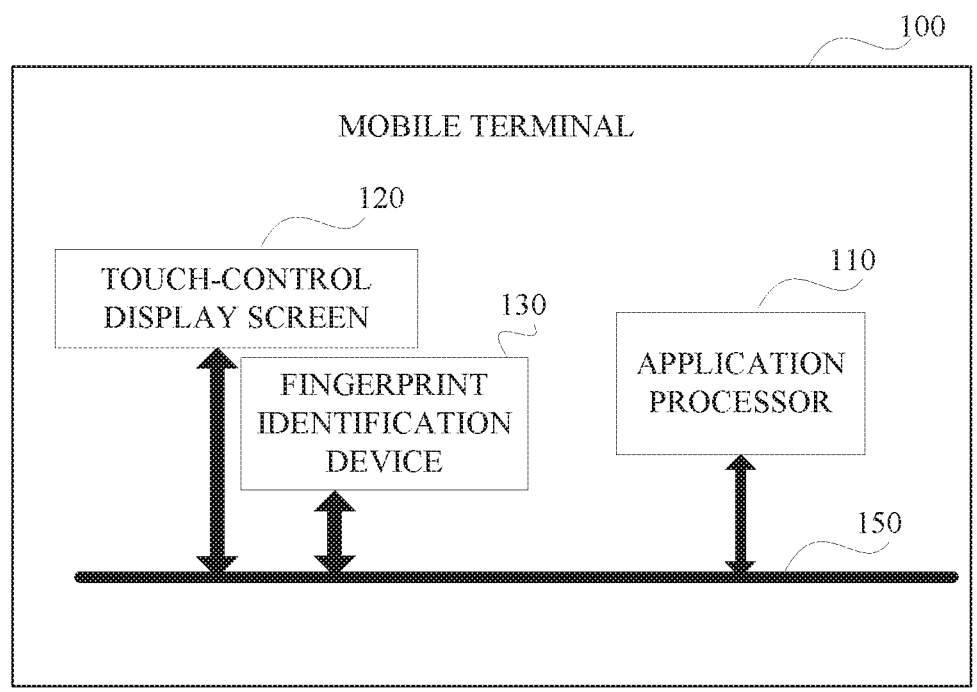
FIG. 1 is a structural schematic diagram illustrating a mobile terminal according to an implementation of the present disclosure.

Technical solutions of the implementations of the present disclosure will be described below clearly and completely in conjunction with the accompanying drawings of the implementations of the present disclosure. Obviously, the described implementations are merely some rather than all of the implementations of the present disclosure. On the basis of the implementations of the present disclosure, all other implementations obtained by a person skilled in the art without creative efforts shall fall within the protection scope of the present disclosure.

The terms "first", "second", "third", and "fourth" used in the specification, the claims, and the accompanying drawings of the present disclosure are used for distinguishing between different objects rather than describing a particular order. The terms "include", "comprise", and "have" as well as variations thereof are intended to cover a non-exclusive inclusion. For example, a process, method, system, product, or apparatus including a series of steps or modules is not limited to the listed steps or modules, it can optionally include other steps or modules that are not listed; alternatively, other steps or modules inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

Mobile terminals described in the implementations of the disclosure can include smart phones (for example, Android phones, iPhone operation system (IOS) phones, windows phones, etc.), tablets, handheld computers, notebook computers, mobile internet devices (MID), wearable equipment, or the like. The mobile terminals described above are merely illustrative and not exhaustive, which includes but is not limited to the foregoing mobile terminals.

It will be apparent that, in the implementations of the disclosure, under a touch-control display screen of the mobile terminal, not only a touch-control sensor array is disposed, but also a fingerprint identification device is integrated. The touch-control sensor array is configured to collect touch-control parameters. The touch-control parameters can include but are not limited to: a press strength on the touch-control display screen, a press area on the touch-control display screen, a press time duration on the touch-control display screen, a sliding track on the touch-control display screen, etc. A touch-control parameter set can include at least one touch-control parameter. The fingerprint identification device is configured to collect fingerprint images. When a sliding operation is performed on the touch-control display screen by a user, the fingerprint identification device collects at least one fingerprint image, for example a fingerprint image at a start point of the sliding operation, a fingerprint image at an end point of the sliding operation, a fingerprint image at a given time of the sliding operation (that is, a fingerprint image at a certain time after the beginning of the sliding operation), or, a fingerprint image at a given location of the sliding operation (that is, a fingerprint image collected when a distance between a certain location after the beginning of the sliding operation and the start point is equal to a certain threshold value).

During implementation, the following situations may occur. When the sliding operation is performed by the user, surfaces on different locations of the touch-control display screen are different, for example, some places have oil stains or appears cracks, and thus fingerprint images collected at different locations are also different; when the sliding operation is performed on the touch-control display screen by the user, contact surfaces between a finger and the touch-control display screen are changed, or press strength between the finger and the touch-control display screen are different, and thus fingerprint images collected at different locations or different moments are also different.

The disclosure provides a fingerprint identification device applied to a mobile terminal. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units.

The disclosure provides a mobile terminal including a fingerprint identification device. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units.

The disclosure provides a mobile terminal including an application processor (AP), a touch-control display screen, and a fingerprint identification device. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units. The touch-control display screen is configured to inform the N fingerprint identification units of the fingerprint identification device corresponding to a target area to collect fingerprints, when a touch operation of the user on the target area is detected, wherein N is a positive integer. The fingerprint identification device is configured to control the N fingerprint identification units to collect the fingerprints to obtain N fingerprint images, and is configured to send the N fingerprint images to the AP. The AP is configured to verify the N fingerprint images, and perform a fingerprint unlocking operation when a verification of the N fingerprint images is successful.

The disclosure provides an unlocking control method, applied to a mobile terminal including an application processor (AP), a touch-control display screen, and a fingerprint identification device. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units. The method includes: controlling, by the mobile terminal, the touch-control display screen to inform the N fingerprint identification units of the fingerprint identification device corresponding to a target area to collect fingerprints, when a touch operation of a user on the target area is detected; N is a positive integer; controlling, by the mobile terminal through the fingerprint identification device, the N fingerprint identification units to collect the fingerprints to obtain N fingerprint images, and sending the N fingerprint images to the AP; verifying, by the AP under control of the mobile terminal, the N fingerprint images, and performing a fingerprint unlocking operation when a verification of the N fingerprint images is successful.

The disclosure provides a mobile terminal including an application processor (AP), a touch-control display screen, a fingerprint identification device, a memory, and one or more programs. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units. The one or more programs are stored in the memory and are configured to be executed by the AP. The programs include instructions which, when executed, are configured to perform the following operations: controlling, by the mobile terminal, the touch-control display screen to inform the N fingerprint identification units of the fingerprint identification device corresponding to a target area to collect fingerprints, when a touch operation of a user on the target area is detected; N being a positive integer; controlling, by the mobile terminal through the fingerprint identification device, the N fingerprint identification units to collect the fingerprints to obtain N fingerprint images, and sending the N fingerprint images to the AP; verifying, by the AP under control of the mobile terminal, the N fingerprint images, and performing a fingerprint unlocking operation when a verification of the N fingerprint images is successful.

The disclosure provides an unlocking control apparatus applied to a mobile terminal including an application processor (AP), a touch-control display screen, and a fingerprint identification device. The fingerprint identification device includes N fingerprint identification units. A fingerprint collecting surface of at least one of the N fingerprint identification units is configured to wait for a touch of a user in a process of fingerprint collecting. The fingerprint identification device at least includes two types of fingerprint identification units. The unlocking control apparatus includes a detecting unit, a collecting unit, and an unlocking unit; the detecting unit is configured to control the touch-control display screen to inform the N fingerprint identification units of the fingerprint identification device to collect fingerprints, when a touch operation on a target area performed by the user is detected; the N fingerprint identification units correspond to the target area; N is a positive integer; the collecting unit is configured to control the N fingerprint identification units to collect the fingerprints to obtain N fingerprint images, and is configured to send the N fingerprint images to the AP, through the fingerprint identification device; the unlocking unit is configured to control the AP to verify the N fingerprint images, and control the AP to perform a fingerprint unlocking operation when a verification of the N fingerprint images is successful.

The disclosure provides a non-transitory computer-readable storage medium. The non-transitory computer-readable storage medium is configured to store computer programs for electronic data interchange, and the computer programs are operable with a computer to perform the following operations: controlling, by a mobile terminal, a touch-control display screen to inform N fingerprint identification units of a fingerprint identification device corresponding to a target area to collect fingerprints, when a touch operation of a user on the target area is detected; N is a positive integer; controlling, by the mobile terminal through the fingerprint identification device, the N fingerprint identification units to collect the fingerprints to obtain N fingerprint images, and sending the N fingerprint images to the AP; verifying, by the AP under control of the mobile terminal, the N fingerprint images, and performing a fingerprint unlocking operation when a verification of the N fingerprint images is successful.

The disclosure provides a computer program product including a non-transitory computer-readable storage medium that stores computer programs. The computer programs are operable with a computer to perform the following operations: controlling a touch-control display screen by a mobile terminal to inform N fingerprint identification units of a fingerprint identification device corresponding to a target area to collect fingerprints, when a touch operation of a user on the target area is detected; N is a positive integer; controlling, by the mobile terminal through the fingerprint identification device, the N fingerprint identification units to collect the fingerprints to obtain N fingerprint images, and sending the N fingerprint images to the AP; verifying, by the AP under control of the mobile terminal, the N fingerprint images, and performing a fingerprint unlocking operation when a verification of the N fingerprint images is successful.

Referring to FIG. 1, FIG. 1 is a structural schematic diagram illustrating a mobile terminal 100 according to an implementation of the present disclosure. The mobile terminal 100 includes: an application processor (AP) 110, a touch-control display screen 120, and a fingerprint identification device 130. The fingerprint identification device 130 is coupled to the touch-control display screen 120. The AP 110 is connected to the touch-control display screen 120 and the fingerprint identification device 130 through a bus 150. The fingerprint identification device 130 can also be integrated on the touch-control display screen 120 to form a full touch screen.

The touch-control display screen 120 is configured to inform N fingerprint identification units of the fingerprint identification device 130 to collect fingerprints, when a touch operation of a user on a target area is detected; the N fingerprint identification units correspond to the target area; N is a positive integer.

The fingerprint identification device 130 is configured to control the N fingerprint identification units to collect the fingerprints to obtain N fingerprint images, and is configured to send the N fingerprint images to the AP 110.

The AP 110 is configured to verify the N fingerprint images, and perform a fingerprint unlocking operation, when a verification of the N fingerprint images is successful.

Thus, the fingerprint identification device 130 can include a plurality of types of fingerprint identification units, to enrich features of the fingerprint identification device 130. Since each of the plurality of types of fingerprint identification units has its own features, it is easier to use the features to perform the fingerprint identification operation.

Figure 1A:
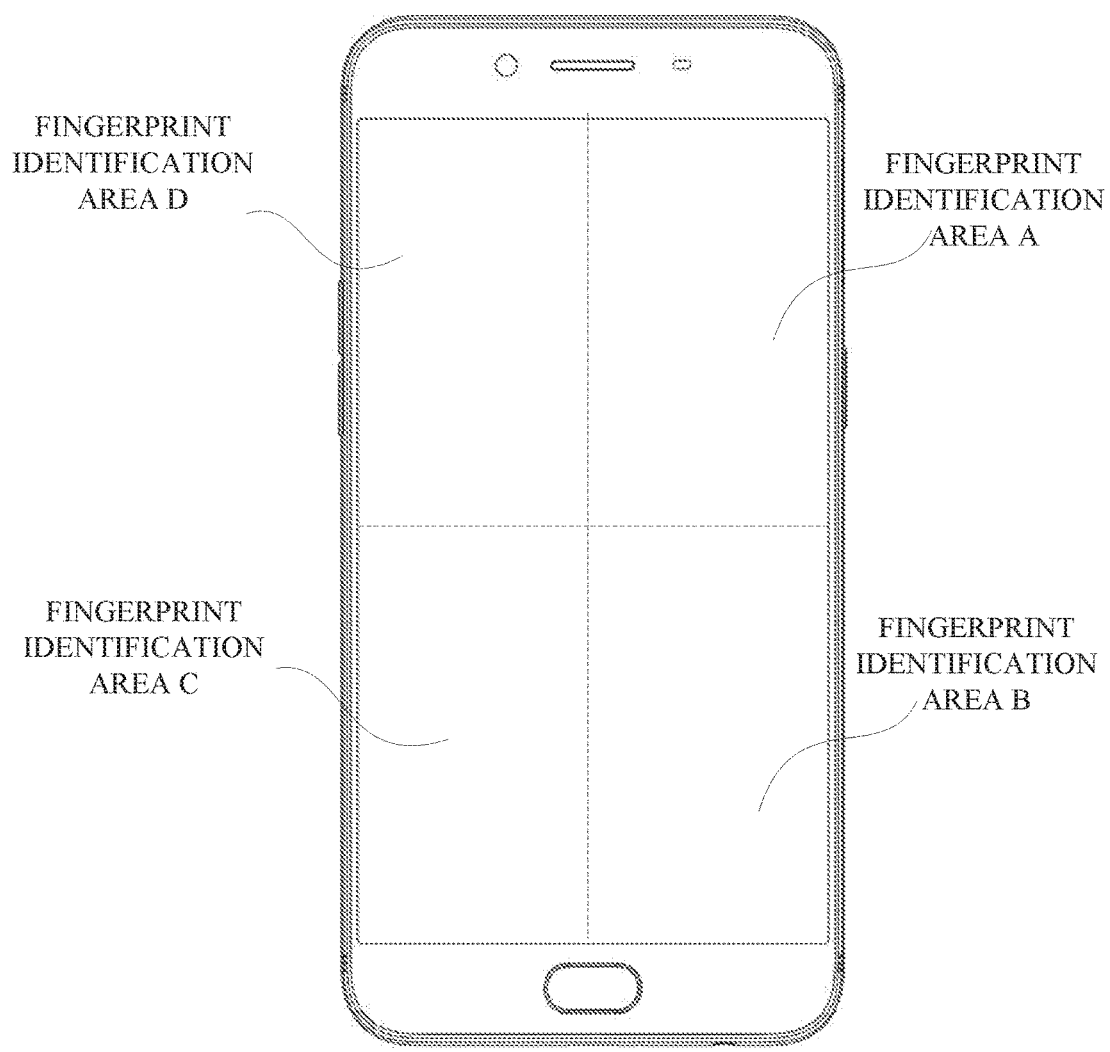
FIG. 1a is an interface demonstration diagram illustrating a fingerprint identification area displayed on a touch-control display screen of a mobile terminal according to an implementation of the present disclosure.

For examples, the fingerprint identification device 130 includes four fingerprint identification units. Each of the four fingerprint identification units corresponds to a fingerprint identification area. Each fingerprint identification area can be configured to collect fingerprints. As illustrated in FIG. 1a, FIG. 1a provides four fingerprint identification areas corresponding to the four fingerprint identification units. The four fingerprint identification areas include a fingerprint identification area A, a fingerprint identification area B, a fingerprint identification area C, and a fingerprint identification area D. According to a touch location of the user's finger, when user's finger just touches the fingerprint identification area A, one of the four fingerprint identification units corresponding to the fingerprint identification area A can only be used to collect fingerprints; when the user's finger touches the fingerprint identification area A and the fingerprint identification area B, fingerprint identification units corresponding to the fingerprint identification area A and the fingerprint identification area B can be used to collect fingerprints.

In other exemplary implementations, the above fingerprint unlocking operation including the following situations are possible: for one example, performing an unlocking operation to enter a desktop of the mobile terminal, when the mobile terminal is in a black screen state; for another example, performing an unlocking operation to enter the desktop of the mobile terminal, when the mobile terminal is in a bright screen state; for an additional example, performing an unlocking operation on a certain application, thus, to enter a home page or a specify page of the application, or to effect payment.

It will be apparent that, according to the implementation of the disclosure, when the touch operation of the user on the target area is detected, the touch-control display screen of the mobile terminal informs the N fingerprint identification units of the fingerprint identification device to collect the fingerprints, where the N fingerprint identification units correspond to the target area and N is a positive integer. The fingerprint identification device controls the N fingerprint identification units to collect the fingerprints to obtain the N fingerprint images, and then sends the N fingerprint images to the AP. The AP verifies the N fingerprint images, and performs the fingerprint unlocking operation when the verification of the N fingerprint images is successful. In this way, the fingerprint identification device can include fingerprint identification units with different features, and thus, in the process of the fingerprint unlocking, at least one fingerprint identification unit can be used to collect the fingerprints. Since features of the fingerprint images collected by different types of fingerprint identification units are different, the features of the fingerprint identification device in related technology can be enriched to a certain extent. Additionally, security of the full touch screen can be improved.

In one exemplary implementation, the fingerprint identification device 130 includes N fingerprint identification units. A fingerprint collecting surface of at least one of the N fingerprint identification units is configured to wait for a touch of the user in a process of fingerprint collecting. The fingerprint identification device 130 at least includes two types of the fingerprint identification units.

Figure 1B:
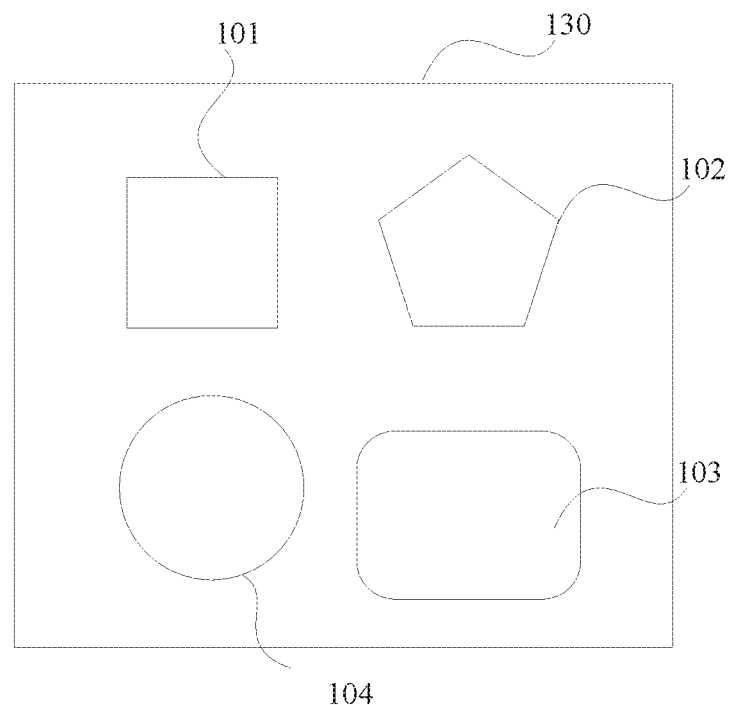
FIG. 1b is a structural schematic diagram illustrating a fingerprint identification device according to an implementation of the present disclosure.

In other exemplary implementations, the fingerprint identification unit can be the following: a capacitive fingerprint sensor, an inductance fingerprint sensor, an optical fingerprint sensor, or an ultrasonic fingerprint sensor. In FIG. 1b, different types of the fingerprint identification units are illustrated in different shapes. The fingerprint identification units with different types can be used for different fingers, which can improve the efficiency of fingerprint identification. For example, a fingerprint identification unit used for dry fingers, or a fingerprint identification unit used for wet fingers can be included. Further, for a plurality of fingerprint identification units is disposed, when a certain fingerprint identification unit is ineffective or broken, other fingerprint identification units can be used to collect fingerprints.

In other exemplary implementations, the N fingerprint identification units can be distributed in an array.

In other exemplary implementations, fingerprint-collecting surfaces of adjacent fingerprint identification units of the N fingerprint identification units are not overlapped.

In other exemplary implementations, an electrical connection is formed between at least two of the N fingerprint identification units.

In other exemplary implementations, fingerprint-collecting surfaces of the N fingerprint identification units are spliced together in a same horizontal plane, to facilitate the N fingerprint identification units to synchronously collect fingerprints.

Figure 1C:
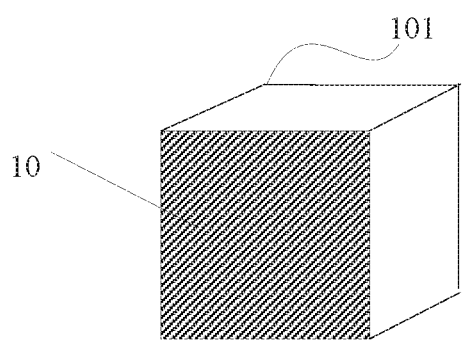
FIG. 1c is a structural schematic diagram illustrating a fingerprint identification device according to an implementation of the present disclosure.

As illustrated in FIG. 1b, FIG. 1b illustrates a possible structure of the above fingerprint identification device 130. The fingerprint identification device 130 includes four fingerprint identification units, for example, a fingerprint identification unit 101, a fingerprint identification unit 102, a fingerprint identification unit 103, and a fingerprint identification unit 104. For example, the fingerprint identification unit 101 can be an inductance fingerprint sensor, the fingerprint identification unit 102 can be an optical fingerprint sensor, the fingerprint identification unit 103 can be a capacitive fingerprint sensor, and the fingerprint identification unit 104 can be an ultrasonic fingerprint sensor. As illustrated in FIG. 1c, FIG. 1c illustrates a three-dimensional structure of the fingerprint identification unit 101, and a surface 10 is a fingerprint collecting surface of the fingerprint identification unit 101.

In one exemplary implementation, the AP 110 configured to verify the N fingerprint images is configured to: acquire each fingerprint comparing scheme corresponding to each of the N fingerprint identification units respectively to obtain N fingerprint comparing schemes, and compare the N fingerprint images with a predefined fingerprint template based on the N fingerprint comparing schemes.

For each of the N fingerprint identification units corresponds to one fingerprint comparing scheme, the N fingerprint identification units can correspond to the N fingerprint comparing schemes, and the N fingerprint images can be compared with the predefined fingerprint template based on the N fingerprint comparing schemes. The predefined fingerprint template can be stored in the mobile terminal in advance.

In one exemplary implementation, the AP 110 configured to compare the N fingerprint images with the predefined fingerprint template based on the N fingerprint comparing schemes is configured to do that: according to a corresponding fingerprint comparing scheme, the AP 110 respectively compares each of the N fingerprint images with the predefined fingerprint template to obtain N comparing values, then the AP calculates an average value of the N comparing values, and the AP determines that the N fingerprint images are matched with the predefined fingerprint template when the average value is greater than a predefined threshold value.

According to the corresponding fingerprint comparing scheme, the AP 110 can respectively compare each of the N fingerprint images with the predefined fingerprint template to obtain the N comparing values, then calculate the average value of the N comparing values, and when the average value is greater than the predefined threshold value, determine that the N fingerprint images are matched with the predefined fingerprint template. The predefined threshold value can be defined by the user or can be a system default. The N fingerprint images above are collected by the N fingerprint identification units. For image quality and image features of the fingerprint images collected by the N fingerprint identification units are all different, different fingerprint comparing schemes can be directly used to compare the N fingerprint images, to improve the efficiency of the fingerprint identification.

In one exemplary implementation, the AP 110 configured to verify the N fingerprint images is configured to do that: the AP 110 respectively gains a fingerprint unlocking threshold value corresponding to each of the N fingerprint identification units to obtain N fingerprint unlocking threshold values, and then the AP compares the N fingerprint images with the predefined fingerprint template based on the N fingerprint unlocking threshold values.

For each of the N fingerprint identification units corresponds to one fingerprint unlocking threshold value, and image quality and image features of the fingerprint images collected by the N fingerprint identification units are all different, when the same fingerprint comparing scheme is used, different fingerprint unlocking threshold values can be defined. The AP 110 respectively gains the fingerprint unlocking threshold value corresponding to each of the N fingerprint identification units to obtain the N fingerprint unlocking threshold values, and then compares the N fingerprint images with the predefined fingerprint template based on the N fingerprint unlocking threshold values.

In one exemplary implementation, the AP 110 configured to compare the N fingerprint images with the predefined fingerprint template based on the N fingerprint unlocking threshold values is configured to do that: the AP 110 calculates an average value of the N fingerprint unlocking threshold values, and then the AP determines that the N fingerprint images are matched with the predefined fingerprint template, when a comparing value between each of the N fingerprint images and the predefined fingerprint template is greater than the average value of the N fingerprint unlocking threshold values.

The AP 110 can calculate the average value of the N fingerprint unlocking threshold values, then determine that the N fingerprint images are matched with the predefined fingerprint template, when the comparing value between each of the N fingerprint images and the predefined fingerprint template is greater than the average value of the N fingerprint unlocking threshold values. For image quality and image features of the fingerprint image collected by each of the N fingerprint identification units are all different, when the average value of the N fingerprint unlocking threshold values is determined, as long as the comparing value between each of the N fingerprint images and the predefined fingerprint template is greater than the average value of the N fingerprint unlocking threshold values, the N fingerprint images are determined to be matched with the predefined fingerprint template, and then an unlocking operation can be performed.

In one exemplary implementation, the AP 110 can further be configured to: control the touch screen to highlight areas corresponding to the fingerprint identification units touched by dry fingers or wet fingers, when the verification of the N fingerprint images is failed and the N fingerprint images are fingerprint images of the dry fingers or the wet fingers.

In one concrete implementation, for fingerprint lines of the fingerprint images belonging to the dry fingers are inconsecutive, and most areas of fingerprint lines of the fingerprint images belonging to the wet fingers are blurry and almost cannot be distinguished, features of the fingerprint lines of the fingerprint images can be obtained by analyzing the fingerprint images, then according to the features of the fingerprint lines, the fingerprint images can be determined to be fingerprint images of the dry fingers or the wet fingers. For example, the fingerprint images can be determined to be fingerprint images of the dry fingers or the wet fingers, by extracting the features of the fingerprint lines of the fingerprint images. If the fingerprint lines of the fingerprint images are inconsecutive, the fingerprint images are the fingerprint images of the dry fingers; if most areas of the fingerprint lines of the fingerprint images are blurry, the fingerprint images are the fingerprint images of the wet fingers. Further, when the verification of the N fingerprint images is failed, and the AP 110 has determined that the N fingerprint images are the fingerprint images of the dry fingers or the wet fingers, the touch-control display screen is controlled to highlight the areas corresponding to the fingerprint identification units touched by the dry fingers or the wet fingers.

In one exemplary implementation, the touch-control display screen 120 includes a touch-control screen and a display screen. The touch-control screen and the display screen are positioned by layers, and the display screen is positioned on a bottom side of the touch-control screen. The fingerprint identification device 130 includes a fingerprint sensor. The fingerprint sensor includes at least one kind of an optical fingerprint sensor, an inductance fingerprint sensor, a capacitive fingerprint sensor, an ultrasonic fingerprint sensor, and the like.

Based on a condition that the fingerprint sensors are capacitive fingerprint sensors, and the touch-control screen of the touch-control display screen is a capacitive touch screen, a specific form of the fingerprint identification device being coupled to the touch-control display screen may be, for example, the fingerprint identification device is integrated into the touch-control screen of the touch-control display screen. As one implementation, a first sensing capacitor array of the fingerprint identification device may be embedded in a second sensing capacitor array of the touch-control screen.

Based on a condition that the fingerprint sensors are optical fingerprint sensors, a specific form of the fingerprint identification device being coupled to the touch-control display screen may be, for example, the fingerprint identification device is integrated into the touch-control display screen. The fingerprint identification device of the mobile terminal collects user fingerprint data based on the pinhole imaging principle. A spacer layer between the touch-control screen and the display screen of the touch-control display screen defines a first pinhole array layer. A driving circuit layer of the display screen defines an evenly distributed pinhole array in a printing process. The evenly distributed pinhole array on the driving circuit layer serves as a second pinhole array layer, and light transmission holes in the first pinhole array layer and light transmission holes in the second pinhole array layer are in a one-to-one correspondence. The optical fingerprint sensor includes a charge-coupled device (CCD) array layer for detecting light transmitted through the first pinhole array layer and the second pinhole array layer.

Based on a condition that the fingerprint sensors are ultrasonic fingerprint sensors, a specific form of the fingerprint identification device being coupled with the touch-control display screen may be, for example, a vacuum detection chamber is defined below an inner side of the touch-control display screen, and a number of ultrasonic sensors are uniformly arranged in the vacuum detection chamber. The ultrasonic sensors include ultrasonic signal transmitters and ultrasonic signal receivers. The ultrasonic signal transmitters are configured to emit signals of a specific frequency to detect user fingerprints, and the ultrasonic signal receivers are configured to receive echo signals reflected back. The operating principle of the ultrasonic sensors is to make use of the ability of the ultrasonic to penetrate the material and generate different sizes of echoes according to different materials (varying degrees of absorption, penetration and reflection when the ultrasonic wave reaches different material surfaces), to distinguish locations of ridge and valley of the user's fingerprint surface.

The display screen can be a thin film transistor-liquid crystal display (TFT-LCD), a light emitting diode (LED) screen, or an organic light-emitting diode (OLED) screen, or the like.

Figure 2:
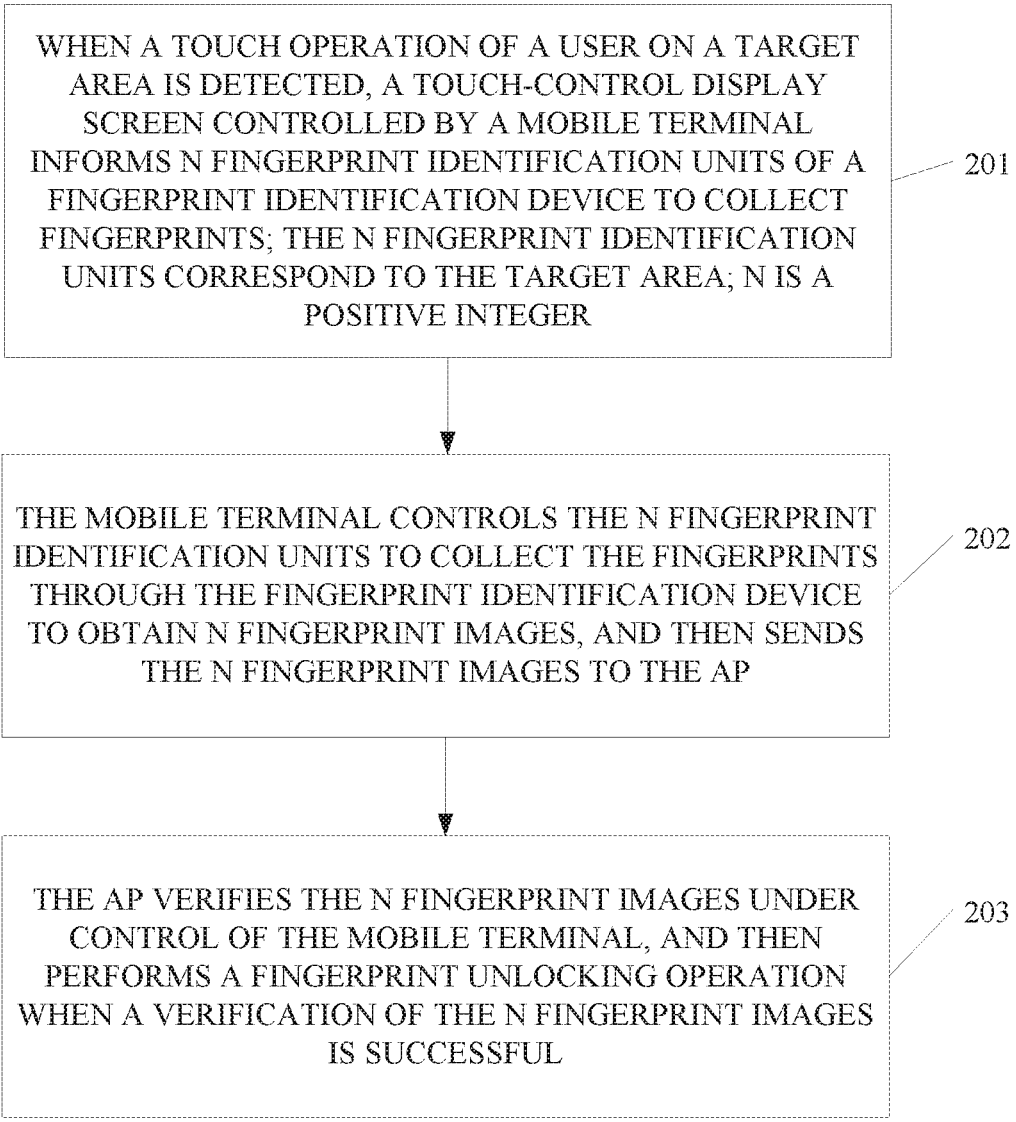
FIG. 2 is a schematic flowchart illustrating an unlocking control method according to an implementation of the present disclosure.

Referring to FIG. 2, FIG. 2 is a flowchart illustrating an unlocking control method according to an implementation of the present disclosure, consistent with the implementations illustrated by the above FIG. 1. The method is applied to a mobile terminal, which includes an application processor (AP), a touch-control display screen, and a fingerprint identification device. The fingerprint identification device is coupled to the touch-control display screen. As illustrated in FIG. 2, the unlocking control method includes the following actions.

At block 201, when a touch operation of a user on a target area is detected, the touch-control display screen controlled by the mobile terminal informs N fingerprint identification units of the fingerprint identification device to collect fingerprints; the N fingerprint identification units correspond to the target area; N is a positive integer.

At block 202, through the fingerprint identification device, the mobile terminal controls the N fingerprint identification units to collect the fingerprints to obtain N fingerprint images, and then sends the N fingerprint images to the AP.

At block 203, under control of the mobile terminal, the AP verifies the N fingerprint images, and then performs a fingerprint unlocking operation when a verification of the N fingerprint images is successful.

In one exemplary implementation, the process of the AP verifying the N fingerprint images controlled by the mobile terminal, includes that: under control of the mobile terminal, the AP respectively gains each fingerprint comparing scheme corresponding to each of the N fingerprint identification units to obtain N fingerprint comparing schemes, and then the AP compares the N fingerprint images with a predefined fingerprint template based on the N fingerprint comparing schemes.

In one exemplary implementation, the process of the AP comparing the N fingerprint images with the predefined fingerprint template based on the N fingerprint comparing schemes under control of the mobile terminal, includes that: under control of the mobile terminal, according to a corresponding fingerprint comparing scheme, the AP respectively compares each of the N fingerprint images with the predefined fingerprint template to obtain N comparing values, and the AP calculates an average value of the N comparing values, then the AP determines that the N fingerprint images are matched with the predefined fingerprint template, when the average value is greater than a predefined threshold value.

In one exemplary implementation, the process of the AP verifying the N fingerprint images controlled by the mobile terminal, includes that: under control of the mobile terminal, the AP respectively gains a fingerprint unlocking threshold value corresponding to each of the N fingerprint identification units to obtain N fingerprint unlocking threshold values, and then the AP compares the N fingerprint images with the predefined fingerprint template based on the N fingerprint unlocking threshold values.

In one exemplary implementation, the process of the AP comparing the N fingerprint images with the predefined fingerprint template based on the N fingerprint unlocking threshold values under control of the mobile terminal, includes that: under control of the mobile terminal, the AP calculates an average value of the N fingerprint unlocking threshold values, and then the AP determines that the N fingerprint images are matched with the predefined fingerprint template, when a comparing value between each of the N fingerprint images and the predefined fingerprint template is greater than the average value of the N fingerprint unlocking threshold values.

In one exemplary implementation, after the action at block 203, the method can further include: under control of the mobile terminal, when the N fingerprint images are verified unsuccessfully, and the AP has determined that the N fingerprint images are fingerprint images of dry fingers or wet fingers, the touch-control display screen is controlled to highlight areas corresponding to the fingerprint identification units touched by the dry fingers or the wet fingers.

It will be apparent that, according to the implementations of the disclosure, when the touch operation of the user on the target area is detected by the touch-control display screen of the mobile terminal, the touch-control display screen of the mobile terminal informs the N fingerprint identification units of the fingerprint identification device to collect the fingerprints; the N fingerprint identification units correspond to the target area; N is a positive integer. The fingerprint identification device controls the N fingerprint identification units to collect the fingerprints to obtain the N fingerprint images, and then sends the N fingerprint images to the AP. The AP verifies the N fingerprint images, and then performs the fingerprint unlocking operation when the verification of the N fingerprint images is successful. In this way, the fingerprint identification device can include fingerprint identification units with different features, and thus, in the process of the fingerprint unlocking, at least one fingerprint identification unit can be used to collect the fingerprints. For features of the fingerprint images collected by different types of fingerprint identification units are different, the features of the fingerprint identification device in related technology can be enriched to a certain extent. Additionally, security of the full touch screen can be improved.

Figure 3:
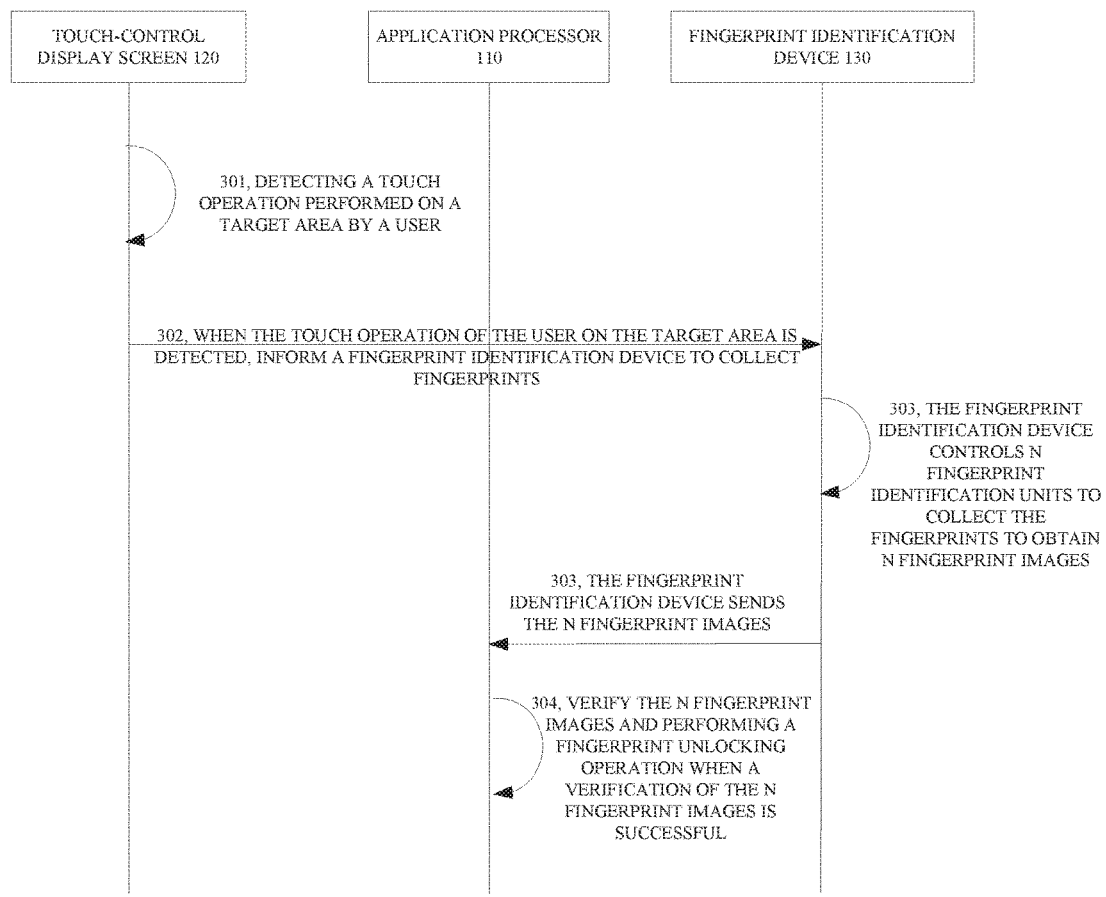
FIG. 3 is a schematic flowchart illustrating another unlocking control method according to an implementation of the present disclosure.

FIG. 3 illustrates the main process related to the implementations of the disclosure, based on inner operations of the mobile terminal 100. At block 301, the touch-control display screen 120 detects a touch operation performed on a target area by a user. At block 302, when the touch operation of the user on the target area is detected, the touch-control display screen 120 informs N fingerprint identification units of the fingerprint identification device 130 to collect fingerprints; the N fingerprint identification units correspond to the target area; N is a positive integer. At block 303, the fingerprint identification device 130 controls the N fingerprint identification units to collect the fingerprints to obtain N fingerprint images, and sends the N fingerprint images to the AP 110. At block 304, the AP 110 verifies the N fingerprint images, and performs a fingerprint unlocking operation when a verification of the N fingerprint images is successful.

Figure 4:
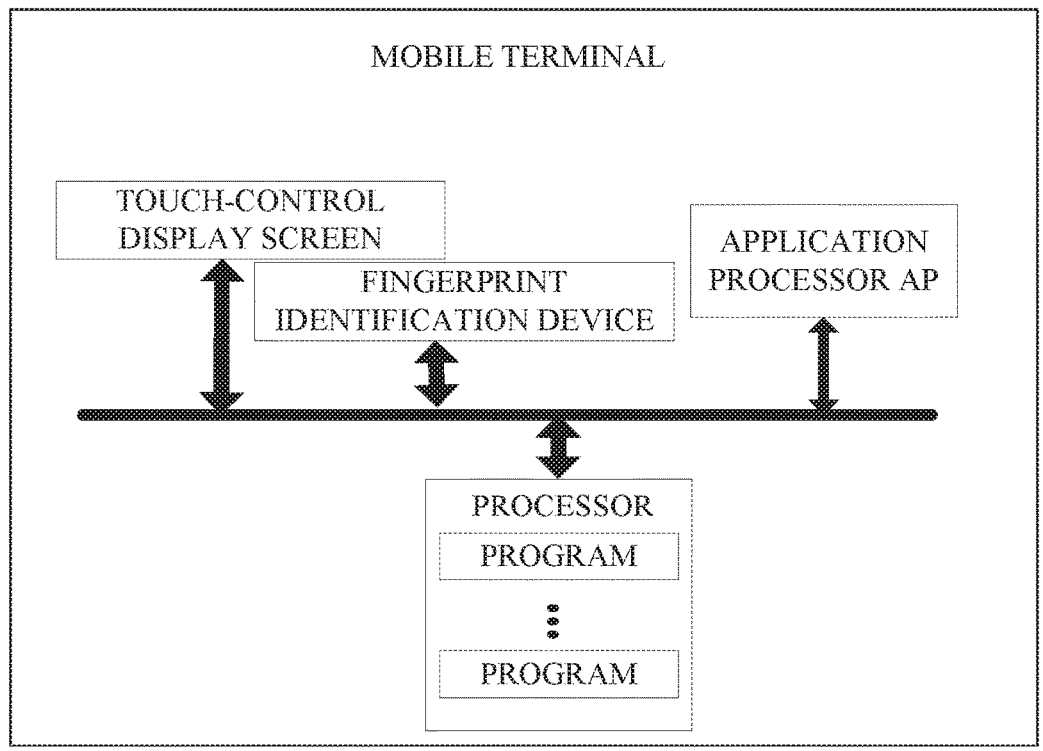
FIG. 4 is a structural schematic diagram illustrating another mobile terminal according to an implementation of the present disclosure.

Referring to FIG. 4, FIG. 4 illustrates a mobile terminal provided by an implementation of the present disclosure, and the mobile terminal includes an application processor (AP), a touch-control display screen, a fingerprint identification device, a memory, and one or more programs. The one or more programs are stored in the memory, and are configured to be executed by the AP. The programs include instructions which, when executed, are configured to perform the following actions: when a touch operation on a target area performed by a user is detected, controlling the touch-control display screen to inform N fingerprint identification units of the fingerprint identification device to collect fingerprints; the N fingerprint identification units corresponding to the target area; N being a positive integer; controlling the N fingerprint identification units to collect the fingerprints to obtain N fingerprint images and sending the N fingerprint images to the AP; controlling the AP to verify the N fingerprint images, and perform a fingerprint unlocking operation, when a verification of the N fingerprint images is successful.

In one exemplary implementation, the instructions of the programs configured to control the AP to verify the N fingerprint images are configured to perform actions of: controlling the AP to respectively gain a fingerprint comparing scheme corresponding to each of the N fingerprint identification units to obtain N fingerprint comparing schemes, and controlling the AP to compare the N fingerprint images with a predefined fingerprint template based on the N fingerprint comparing schemes.

In one exemplary implementation, the instructions of the programs configured to control by the mobile terminal the AP to compare the N fingerprint images with the predefined fingerprint template based on the N fingerprint comparing schemes are configured to perform actions of: according to a corresponding fingerprint comparing scheme, controlling the AP to respectively compare each of the N fingerprint images with the predefined fingerprint template to obtain N comparing values, and controlling the AP to calculate an average value of the N comparing values, and then to determine that the N fingerprint images are matched with the predefined fingerprint template, when the average value is greater than a predefined threshold value.

In one exemplary implementation, the instructions of the programs configured to control the AP to verify the N fingerprint images are configured to perform actions of: controlling the AP to respectively gain a fingerprint unlocking threshold value corresponding to each of the N fingerprint identification units to obtain N fingerprint unlocking threshold values, and controlling the AP then to compare the N fingerprint images with the predefined fingerprint template based on the N fingerprint unlocking threshold values.

In one exemplary implementation, the instructions of the programs configured to control the AP to compare the N fingerprint images with the predefined fingerprint template based on the N fingerprint unlocking threshold values are configured to perform actions of: controlling the AP to calculate an average value of the N fingerprint unlocking threshold values, and controlling the AP then to determine that the N fingerprint images are matched with the predefined fingerprint template, when a comparing value between each of the N fingerprint images and the predefined fingerprint template is greater than the average value of the N fingerprint unlocking threshold values.

In one exemplary implementation, the instructions of the programs are further configured to perform an action of: when the N fingerprint images are verified unsuccessfully, and the AP has determined that the N fingerprint images are fingerprint images of dry fingers or wet fingers, controlling the touch-control display screen to highlight areas corresponding to the fingerprint identification units touched by the dry fingers or the wet fingers.

Figure 5:
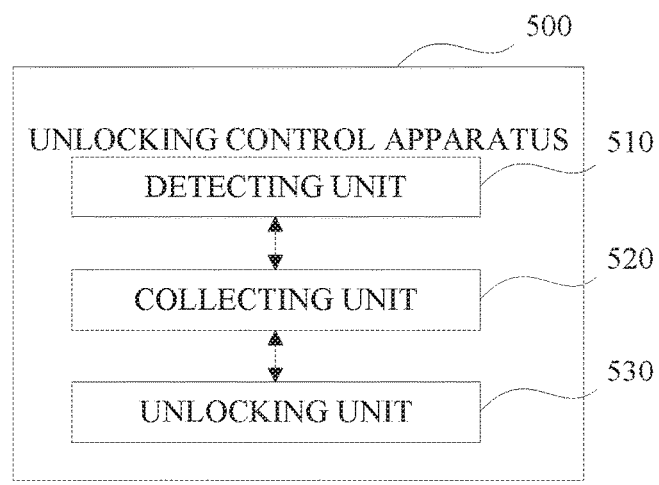
FIG. 5 is a structural schematic diagram illustrating an unlocking control apparatus according to an implementation of the present disclosure.

Referring to FIG. 5, FIG. 5 is a structural schematic diagram illustrating an unlocking control apparatus 500 according to an implementation of the present disclosure. The unlocking control apparatus 500 is applied to a mobile terminal. The mobile terminal includes an application processor (AP), a touch-control display screen, and a fingerprint identification device. The fingerprint identification device is coupled to the touch-control display screen. The unlocking control apparatus 500 includes a detecting unit 510, a collecting unit 520, and an unlocking unit 530.

The detecting unit 510 is configured to control the touch-control display screen to inform N fingerprint identification units of the fingerprint identification device to collect fingerprints, when a touch operation on a target area performed by a user is detected; the N fingerprint identification units correspond to the target area; N is a positive integer.

The collecting unit 520 is configured to control the N fingerprint identification units to collect the fingerprints to obtain N fingerprint images, and is configured to send the N fingerprint images to the AP, through the fingerprint identification device.

The unlocking unit 530 is configured to control the AP to verify the N fingerprint images, and control the AP to perform a fingerprint unlocking operation when a verification of the N fingerprint images is successful.

It will be apparent that, functions of various program modules of the unlocking control apparatus 500 can be implemented by the methods of the above method implementations. Detailed implementations may refer to the descriptions of the above method implementations, and is not described herein again.

Figure 6:
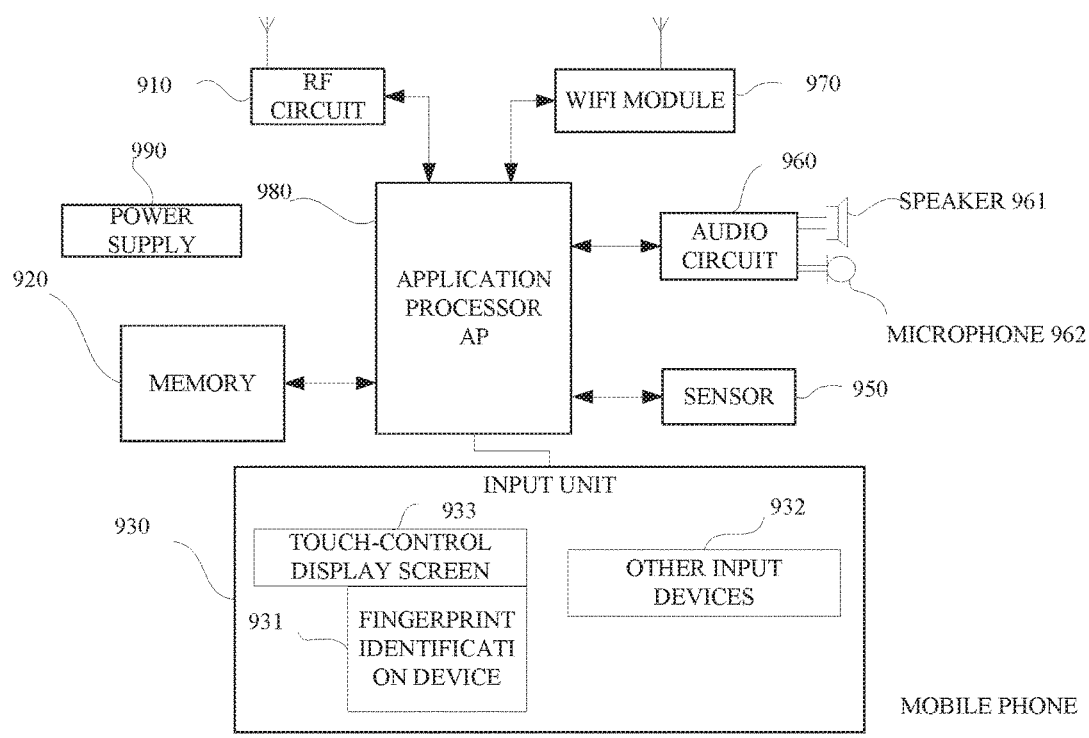
FIG. 6 is a structural schematic diagram illustrating still another mobile terminal according to an implementation of the present disclosure.

As illustrated in FIG. 6, another mobile terminal is provided in an implementation of the present disclosure. For the convenience of description, only parts related to the implementations of the present disclosure are illustrated. For technical details that are not disclosed, reference may be made to the method implementations of the present disclosure. The mobile terminal may be any terminal device selected from a group consisting of a mobile phone, a tablet computer, a personal digital assistant (PDA), a point of sale terminal (POS), an on-board computer. Taking a mobile terminal as a mobile phone, for example.

FIG. 6 illustrates a block diagram of a part of the structure of a mobile phone related to the mobile terminal provided by the implementation of the present disclosure. Referring to FIG. 6, the mobile phone includes a radio frequency (RF) circuit 910, a memory 920, an input unit 930, a sensor 950, an audio circuit 960, a wireless fidelity (Wi-Fi) module 970, an application processor (AP) 980, and a power supply 990 and other components. Those skilled in the art should understand that, the structure of the mobile phone illustrated in FIG. 6 is not limit the mobile phone of the present disclosure. The structure can include more or fewer components, or some components can be combined, or components can be arranged in a different way.

Each component of the mobile phone will be specifically introduced below in combination with the accompanying FIG. 6.

The input unit 930 may be configured to receive input numerical or character information, and generate key signal inputs related to user settings and function controls of the mobile phone. Specifically, the input unit 930 may include a touch-control display screen 933, a fingerprint identification device 931, and other input devices 932. The fingerprint identification device 931 is combined with the touch-control display screen 933. The input unit 930 may further include other input devices 932. Specifically, the other input devices 932 may include, but are not limited to one or more of a physical key, a function key (for example a volume control key, a switch key, and so on), a trackball, a mouse, a joystick, and so on. The touch-control display screen 933 informs N fingerprint identification units of the fingerprint identification device 931 to collect fingerprints, when a touch operation on a target area performed by the user is detected; the N fingerprint identification units correspond to the target area; N is a positive integer. The fingerprint identification device 931 controls the N fingerprint identification units to collect the fingerprints to obtain N fingerprint images, and sends the N fingerprint images to the AP 980. The AP 980 verifies the N fingerprint images, and performs a fingerprint unlocking operation when a verification of the N fingerprint images is successful.

The AP 980 is a control center for the mobile phone that uses various interfaces and lines to connect various components of the mobile phone, performs various functions and processes data of the mobile phone by running or executing software programs and/or modules stored in the memory 920, and invoking data stored in the memory 920, thereby overall monitoring the mobile phone. Alternatively, the AP 980 may include one or more processing units. Preferably, the AP 980 may integrate an application processor and a modem processor. The application processor mainly deals with the operating system, user interface, application programs, and so on. The modem processor mainly deals with wireless communication. It should be understood that, the above modem processor may not be integrated into the AP 980.

The memory 920 may include a high-speed random access memory, and may further include a non-transitory storage device, for example at least one magnetic disk storage device, flash memory device, or another transitory solid-state storage device.

The RF circuit 910 may be configured for the reception and transmission of information. In general, the RF circuit 910 includes, but not limited to, an antenna, at least one amplifier, a transceiver, a coupler, a low noise amplifier (LNA), a duplexer, and so on. In addition, the RF circuit 910 may also communicate with the network and other devices by wireless communication. The above wireless communication may use any communication standard or protocol, which includes, but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and so on.

The mobile phone may further include at least one sensor 950, such as a light sensor, a motion sensor, and other sensors. Specifically, the light sensor may include an ambient light sensor and a proximity sensor. The ambient light sensor may adjust the brightness of the touch-control display screen according to the brightness of ambient light. The proximity sensor may turn off the touch-control display screen and/or backlight when the mobile phone is near the ear. As a kind of motion sensor, the accelerometer sensor can detect the acceleration in all directions (usually three axes), and can detect the magnitude and direction of gravity at rest. The accelerometer sensor can be used to identify the gesture of the mobile phone (for example horizontal and vertical screen switching, related Games, magnetometer attitude calibration), vibration identification related functions (for example pedometer, percussion), and so on. The mobile phone can also be equipped with other sensors, for example, gyroscopes, barometers, hygrometers, thermometers, infrared sensors, and so on, and details are not described herein again.

The audio circuitry 960, the speaker 961, and microphone 962 provide audio interfaces between the user and the mobile phone. The audio circuit 960 may transmit the received electrical signal converted from audio data to the speaker 961, and then the electrical signal is converted into a sound signal for playing by the speaker 961. On the other hand, the microphone 962 converts collected sound signal into an electrical signal, which is received by the audio circuit 960 and is converted into an audio signal. The audio signal is played and processed by the AP 980, and then is sent to another mobile phone via the RF circuit 910, for example. Or, the audio data is played to the memory 920 for further processing.

Wi-Fi is a short-range wireless transmission technology. With the Wi-Fi module 970, the mobile phone can help users send and receive e-mail, browse the web, access streaming media, and so on, which provides users with wireless broadband Internet access. Although the Wi-Fi module 970 is illustrated in FIG. 6, however, it should be understood that, the Wi-Fi module 970 is not a necessary component of a mobile phone, and can be completely omitted as needed without changing the essence of the disclosure.

The mobile phone further includes a power supply 990 (for example a battery) for powering various components. Preferably, the power supply can be logically connected to the AP980 via a power management system, to manage charging, discharging, power management functions, and so on, through the power management system.

Although not illustrated, the mobile phone may further include a camera, a Bluetooth module, and so on, and details are not described herein again.

In the foregoing implementations illustrated in FIG. 2 or FIG. 3, each operation of the method may be implemented based on the structure of the mobile phone.

In the foregoing implementations illustrated in FIG. 4 and FIG. 5, the function of each unit may be implemented based on the structure of the mobile phone.

An implementation of the present disclosure further provides a non-transitory computer-readable storage medium. The non-transitory computer-readable storage medium is configured to store computer programs for electronic data interchange. The computer programs are operable with a computer to perform some or all of the operations of any one of the methods for displaying a fingerprint area as described in the above method implementations.

An implementation of the present disclosure further provides a computer program product. The computer program product includes a non-transitory computer-readable storage medium for storing computer programs. The computer programs are operable to cause a computer to execute some or all of the operations of any one of the unlocking control methods as described in the above method implementations.

It should be noted that, for the foregoing method implementations, for a brief description, all of the method implementations are described as a series of operation combinations. However, those skilled in the art should understand that the present disclosure is not limited by the described sequence of operations, as certain steps may be performed in other sequences or concurrently according to the present disclosure. Secondly, those skilled in the art should also know that the implementations described in the specification belong to the preferred implementations, and the actions and modules involved are not necessarily required by the present disclosure.

In the foregoing implementations, descriptions of each implementation are emphasized respectively, and parts which are not elaborated in a certain implementation may subject to relevant descriptions of other implementations.

It should be understood that, the device disclosed in implementations provided herein may be implemented in other ways. For example, the device implementations described above are merely illustrative, for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components illustrated as units may or may not be physical units, and namely, they may be in the same place or may be distributed to multiple network units. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit may be implemented in the form of hardware, or in the form of hardware plus software function unit.

The integrated units may be stored in a non-transitory computer-readable storage medium, if the integrated units are implemented in the form of software functional modules and sold or used as an independent product. Base on this understanding, the technical solution of the present disclosure essentially, or the part contributing to the prior art, or all or a part of the technical solution may be implemented in the form of a software product. The computer software product is stored in a storage medium, and includes several instructions for causing a computer device (which may be a personal computer, a server, a network device and so on) to execute some or all of the steps of the method according to each implementation of the present disclosure. The foregoing storage medium includes various media capable of storing program codes, for example, a flash disk, a read-only memory (ROM), a random access memory (RAM), a removable hard disk, a magnetic disk, or an optical disk and so on.

Those skilled in the art should understand that all or part of the steps of the various methods in the foregoing implementations may be implemented by a program instructing relevant hardware. The program may be stored in a non-transitory computer-readable memory, and the memory may include a flash disk, a ROM, a RAM, a magnetic disk, or an optical disk and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A mobile terminal comprising a fingerprint identification device, an application processor (AP), and a touch-control display screen, the fingerprint identification device comprising N fingerprint identification units, a fingerprint collecting surface of at least one of the N fingerprint identification units being configured to wait for a touch of a user in a process of fingerprint collecting, the fingerprint identification device comprising at least two types of fingerprint identification units;
   wherein the touch-control display screen is configured to inform the N fingerprint identification units of the fingerprint identification device corresponding to a target area to collect fingerprints, when a touch operation of the user on the target area is detected; N being a positive integer and being greater than 1; wherein the fingerprint identification units with different types are configured to wait for touches of different fingers of the user, in the process of fingerprint collecting, the fingerprint identification units with different types comprises a fingerprint identification unit used for dry fingers and a fingerprint identification unit used for wet fingers;
   wherein the fingerprint identification device is configured to control the N fingerprint identification units to collect the fingerprints to obtain N fingerprint images, and is configured to send the N fingerprint images to the AP; and
   wherein the AP is configured to verify the N fingerprint images, and perform a fingerprint unlocking operation when a verification of the N fingerprint images is successful; wherein the AP configured to verify the N fingerprint images is configured to: obtain N fingerprint comparing schemes, wherein each of the N fingerprint comparing schemes corresponds to each of the N fingerprint identification units; and compare the N fingerprint images with a predefined fingerprint template based on the N fingerprint comparing schemes.

2. The mobile terminal of claim 1, wherein the AP configured to compare the N fingerprint images with the predefined fingerprint template based on the N fingerprint comparing schemes is further configured to:
   compare each of the N fingerprint images with the predefined fingerprint template, according to a corresponding fingerprint comparing scheme, to obtain N comparing values;
   calculate an average value of the N comparing values; and
   determine that the N fingerprint images are matched with the predefined fingerprint template when the average value is greater than a predefined threshold value.

3. The mobile terminal of claim 1, wherein the AP configured to verify the N fingerprint images is further configured to:
   obtain N fingerprint unlocking threshold values, wherein each of the N fingerprint unlocking threshold values corresponds to each of the N fingerprint identification units; and
   compare the N fingerprint images with a predefined fingerprint template based on the N fingerprint unlocking threshold values.

4. The mobile terminal of claim 3, wherein the AP configured to compare the N fingerprint images with the predefined fingerprint template based on the N fingerprint unlocking threshold values is further configured to:
   calculate an average value of the N fingerprint unlocking threshold values; and
   determine that the N fingerprint images are matched with the predefined fingerprint template, when a comparing value between each of the N fingerprint images and the predefined fingerprint template is greater than the average value.

5. The mobile terminal of claim 1, wherein the AP is further configured to:
   control the touch-control display screen to highlight areas corresponding to the N fingerprint identification units touched by dry fingers or wet fingers, when the verification of the N fingerprint images is failed and the N fingerprint images are fingerprint images of the dry fingers or the wet fingers.

6. The mobile terminal of claim 1, wherein the N fingerprint identification units are distributed in an array.

7. The mobile terminal of claim 1, wherein fingerprint collecting surfaces of adjacent fingerprint identification units of the N fingerprint identification units are not overlapped.

8. An unlocking control method, applied to a mobile terminal comprising an application processor (AP), a touch-control display screen, and a fingerprint identification device, the fingerprint identification device comprising N fingerprint identification units and at least two types of fingerprint identification units, comprising:
controlling, by the mobile terminal, the touch-control display screen to inform the N fingerprint identification units of the fingerprint identification device corresponding to a target area to collect fingerprints, when a touch operation of a user on the target area is detected, N being a positive integer and being greater than 1;
controlling, by the mobile terminal through the fingerprint identification device, the N fingerprint identification units to collect the fingerprints to obtain N fingerprint images, and sending the N fingerprint images to the AP; wherein the fingerprint identification units with different types are configured to wait for touches of different fingers of the user, in the process of fingerprint collecting, the fingerprint identification units with different types comprises a fingerprint identification unit used for dry fingers and a fingerprint identification unit used for wet fingers; and
verifying, by the AP under control of the mobile terminal, the N fingerprint images, and performing a fingerprint unlocking operation when verification of the N fingerprint images is successful; wherein the verifying, by the AP under control of the mobile terminal, the N fingerprint images comprises: obtaining, by the AP under control of the mobile terminal, N fingerprint comparing schemes with each of the N fingerprint comparing schemes corresponding to each of the N fingerprint identification units; and comparing, by the AP under control of the mobile terminal, the N fingerprint images with a predefined fingerprint template based on the N fingerprint comparing schemes.

9. The method of claim 8, wherein the comparing, by the AP under control of the mobile terminal, the N fingerprint images with the predefined fingerprint template based on the N fingerprint comparing schemes comprises:
comparing, by the AP under control of the mobile terminal according to a corresponding fingerprint comparing scheme, each of the N fingerprint images with the predefined fingerprint template to obtain N comparing values;
calculating an average value of the N comparing values by the AP; and
determining, by the AP, that the N fingerprint images are matched with the predefined fingerprint template, when the average value is greater than a predefined threshold value.

10. The method of claim 8, wherein the verifying, by the AP under control of the mobile terminal, the N fingerprint images further comprises:
obtaining, by the AP under control of the mobile terminal, N fingerprint unlocking threshold values, wherein each of the N fingerprint unlocking threshold values corresponds to each of the N fingerprint identification units; and
comparing, by the AP, the N fingerprint images with a predefined fingerprint template based on the N fingerprint unlocking threshold values.

11. The method of claim 10, wherein the comparing, by the AP under control of the mobile terminal, the N fingerprint images with the predefined fingerprint template based on the N fingerprint unlocking threshold values comprises:
calculating, by the AP under control of the mobile terminal, an average value of the N fingerprint unlocking threshold values; and
determining, by the AP, that the N fingerprint images are matched with the predefined fingerprint template, when a comparing value between each of the N fingerprint images and the predefined fingerprint template is greater than the average value.

12. The method of claim 8, further comprising:
controlling, by the mobile terminal, the touch-control display screen to highlight areas corresponding to the N fingerprint identification units touched by dry fingers or wet fingers, wherein when the verification of the N fingerprint images is failed, and the N fingerprint images are fingerprint images of the dry fingers or the wet fingers.

13. A non-transitory computer-readable storage medium, wherein the non-transitory computer-readable storage medium is configured to store computer programs for electronic data interchange, and the computer programs are operable with a computer to perform:
controlling, by a mobile terminal, a touch-control display screen to inform N fingerprint identification units of a fingerprint identification device corresponding to a target area to collect fingerprints, when a touch operation of a user on the target area is detected, N being a positive integer and being greater than 1;
controlling, by the mobile terminal through the fingerprint identification device, the N fingerprint identification units to collect the fingerprints to obtain N fingerprint images, and sending the N fingerprint images to an application processor (AP); wherein the fingerprint identification units with different types are configured to wait for touches of different fingers of the user, in the process of fingerprint collecting, the fingerprint identification units with different types comprises a fingerprint identification unit used for dry fingers and a fingerprint identification unit used for wet fingers; and
verifying, by the AP under control of the mobile terminal, the N fingerprint images, and performing a fingerprint unlocking operation when a verification of the N fingerprint images is successful; wherein the verifying, by the AP under control of the mobile terminal, the N fingerprint images comprises: obtaining, by the AP under control of the mobile terminal, N fingerprint comparing schemes with each of the N fingerprint comparing schemes corresponding to each of the N fingerprint identification units; and comparing, by the AP under control of the mobile terminal, the N fingerprint images with a predefined fingerprint template based on the N fingerprint comparing schemes.

14. The non-transitory computer-readable storage medium of claim 13, wherein the comparing, by the AP under control of the mobile terminal, the N fingerprint images with a predefined fingerprint template based on the N fingerprint comparing schemes comprises:
comparing, by the AP under control of the mobile terminal, each of the N fingerprint images with the predefined fingerprint template according to a corresponding fingerprint comparing scheme, to obtain N comparing values;
calculating an average value of the N comparing values by the AP; and determining, by the AP, that the N fingerprint images are matched with the predefined fingerprint template, when the average value is greater than a predefined threshold value.

15. The non-transitory computer-readable storage medium of claim 13, wherein the verifying, by the AP under control of the mobile terminal, the N fingerprint images further comprises:
  obtaining, by the AP under control of the mobile terminal, N fingerprint unlocking threshold values, wherein each of the N fingerprint unlocking threshold values corresponds to each of the N fingerprint identification units; and
  comparing, by the AP, the N fingerprint images with a predefined fingerprint template based on the N fingerprint unlocking threshold values.

16. The non-transitory computer-readable storage medium of claim 15, wherein the comparing, by the AP under control of the mobile terminal, the N fingerprint images with a predefined fingerprint template based on the N fingerprint unlocking threshold values comprises:
  calculating, by the AP under control of the mobile terminal, an average value of the N fingerprint unlocking threshold values; and
  determining, by the AP, that the N fingerprint images are matched with the predefined fingerprint template, when a comparing value between each of the N fingerprint images and the predefined fingerprint template is greater than the average value.

* * * * *